(12) United States Patent
Dain et al.

(10) Patent No.: US 10,198,190 B2
(45) Date of Patent: Feb. 5, 2019

(54) PERFORMANCE ORIENTED DATA DEDUPLICATION AND DUPLICATION

(71) Applicant: International Business Machines Corporation, Armonk, NY (US)

(72) Inventors: Joseph W. Dain, Vail, AZ (US); Itzhack Goldberg, Hadera (IL); Gregory T. Kishi, Oro Valley, AZ (US); Daniel I. Tan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/339,439

(22) Filed: Oct. 31, 2016

(65) Prior Publication Data

US 2018/0121104 A1    May 3, 2018

(51) Int. Cl.
*G06F 12/00* (2006.01)
*G06F 3/06* (2006.01)

(52) U.S. Cl.
CPC ............ *G06F 3/0611* (2013.01); *G06F 3/065* (2013.01); *G06F 3/067* (2013.01); *G06F 3/0608* (2013.01); *G06F 3/0641* (2013.01); *G06F 3/0673* (2013.01)

(58) Field of Classification Search
None
See application file for complete search history.

(56) References Cited

U.S. PATENT DOCUMENTS

| 7,567,188 B1 | 7/2009 | Anglin et al. |
| 7,908,436 B1 | 3/2011 | Srinivasan et al. |
| 8,443,153 B1 | 5/2013 | Edwards et al. |
| 8,700,684 B2 | 4/2014 | Kim et al. |
| 8,799,601 B1 | 8/2014 | Chen et al. |
| 2010/0088349 A1 | 4/2010 | Parab |
| 2010/0161780 A1 | 6/2010 | Lee et al. |
| 2011/0029739 A1* | 2/2011 | Nakajima ............. G06F 3/0605 711/154 |
| 2011/0138154 A1 | 6/2011 | Tevis et al. |

(Continued)

OTHER PUBLICATIONS

Dorion, P., "Understanding data deduplication for primary storage," SearchStorage.com, Sep. 7, 2010, 2 pages, http://searchstorage.techtarget.com/tip/Understanding-data-deduplication-for-primary-storage.

(Continued)

*Primary Examiner* — Baboucarr Faal
(74) *Attorney, Agent, or Firm* — Kelsey M. Skodje

(57) ABSTRACT

A system and method for data storage management is disclosed. The method includes determining, by an access tracking component, a quantity of access requests for at least one data block, and determining a quantity of current copies of the data block. The method also includes creating, by a duplication component, at least one additional copy of the data block when the quantity of the access requests exceeds an access request threshold. Additionally, a deduplication component removes at least one current copy of the data block when the quantity of the access requests falls below the access request threshold. The access request threshold can be a threshold number of access requests for the data block, the presence of an input/output bottleneck, or a given length of a read latency when accessing the data block. Further, data coloring techniques can be used to distribute current copies of the data block.

13 Claims, 5 Drawing Sheets

(56) References Cited

U.S. PATENT DOCUMENTS

| | | | |
|---|---|---|---|
| 2012/0203809 A1* | 8/2012 | Kim | G06F 17/30194 |
| | | | 707/827 |
| 2014/0310250 A1 | 10/2014 | Ben-Shaul et al. | |
| 2015/0213049 A1 | 7/2015 | Kleiman et al. | |
| 2016/0012098 A1 | 1/2016 | Li et al. | |
| 2016/0110260 A1 | 4/2016 | Chandrasekharan et al. | |
| 2016/0162414 A1 | 6/2016 | Nayak | |
| 2016/0170657 A1 | 6/2016 | Suehr et al. | |

OTHER PUBLICATIONS

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Dain et al., "Performance Oriented Data Deduplication and Duplication," U.S. Appl. No. 15/663,940, filed Jul. 31, 2017.

List of IBM Patents or Patent Applications Treated as Related, Signed Jul. 31, 2017, 2 pages.

Dain et al., "Performance Oriented Data Deduplication and Duplication," U.S. Appl. No. 15/989,319, filed May 25, 2018.

Dain et al., "Performance Oriented Data Deduplication and Duplication," U.S. Appl. No. 15/989,339, filed May 25, 2018.

List of IBM Patents or Patent Applications Treated as Related, Signed May 25, 2018, 2 pages.

* cited by examiner

PERFORMANCE ORIENTED DATA DEDUPLICATION AND DUPLICATION

BACKGROUND

The present disclosure relates to data storage and retrieval methods and, more specifically, to data deduplication.

Data retrieval methods can involve data storage and data compression. Stored data often contains duplicate copies of data blocks. These duplicate copies take up more storage space than a single copy. Data deduplication is a type of data compression that operates by removing redundant data blocks. Deduplication is used to reduce the redundant storage of files in a shared data storage management system. In many cases, data blocks are identified by hash values in an index and, if the hash value of a redundant block is identified, it can be replaced by a pointer to the appropriate matching data block. These hash values and pointers allow data to be retrieved by users who may share available copies of the data blocks.

SUMMARY

Various embodiments are directed to a method for data storage management based on ongoing tracking and analysis of data access patterns. Based on the number of access requests a data block receives, and the current number of copies of the data block, a storage management system can either duplicate or deduplicate data blocks. The number of access requests for the data block can be tracked, and, as the demand for the data blocks fluctuates, copies of the data block can be created or removed. In some cases, the system may create additional copies of the data block when the number of access requests for the data block is above an access request threshold. The access request threshold can be a given number of access requests, the presence of an input/output bottleneck, a given length of read latency, etc. Further, copies of the data block can be removed if the quantity of access requests for the data block falls below the access request threshold. Copies of the data block can also be removed when the quantity of copies of the data block falls below a threshold number of copies. The quantity of copies of the data block can be dynamically altered as changes in the number of access requests are detected. In some embodiments, data coloring techniques can be used to distribute copies of the data block in a way that minimizes overlap when applications access the data block. Additionally, copies of the data block can be created or removed as directed by instructions in an established policy.

DETAILED DESCRIPTION

The method of data storage management described herein can involve the ongoing tracking and analysis of data access patterns in a storage system environment. This tracking and analysis can determine whether to increase or decrease the number of copies of a data block by duplication and deduplication methods, respectively. Deduplication is a process that can save storage space in a computer system by removing redundant copies of data blocks. The remaining data block or blocks can still be accessed by multiple users, but too many users attempting to access a data block at the same time can cause an input/output bottleneck to form, causing longer read latencies. However, input/output bottlenecks can be avoided by duplicating the data block. Further, input/output bottlenecks can be avoided when the duplicate copies of a data block are shared judiciously in order to minimize the number of applications accessing one copy.

Figure 1:
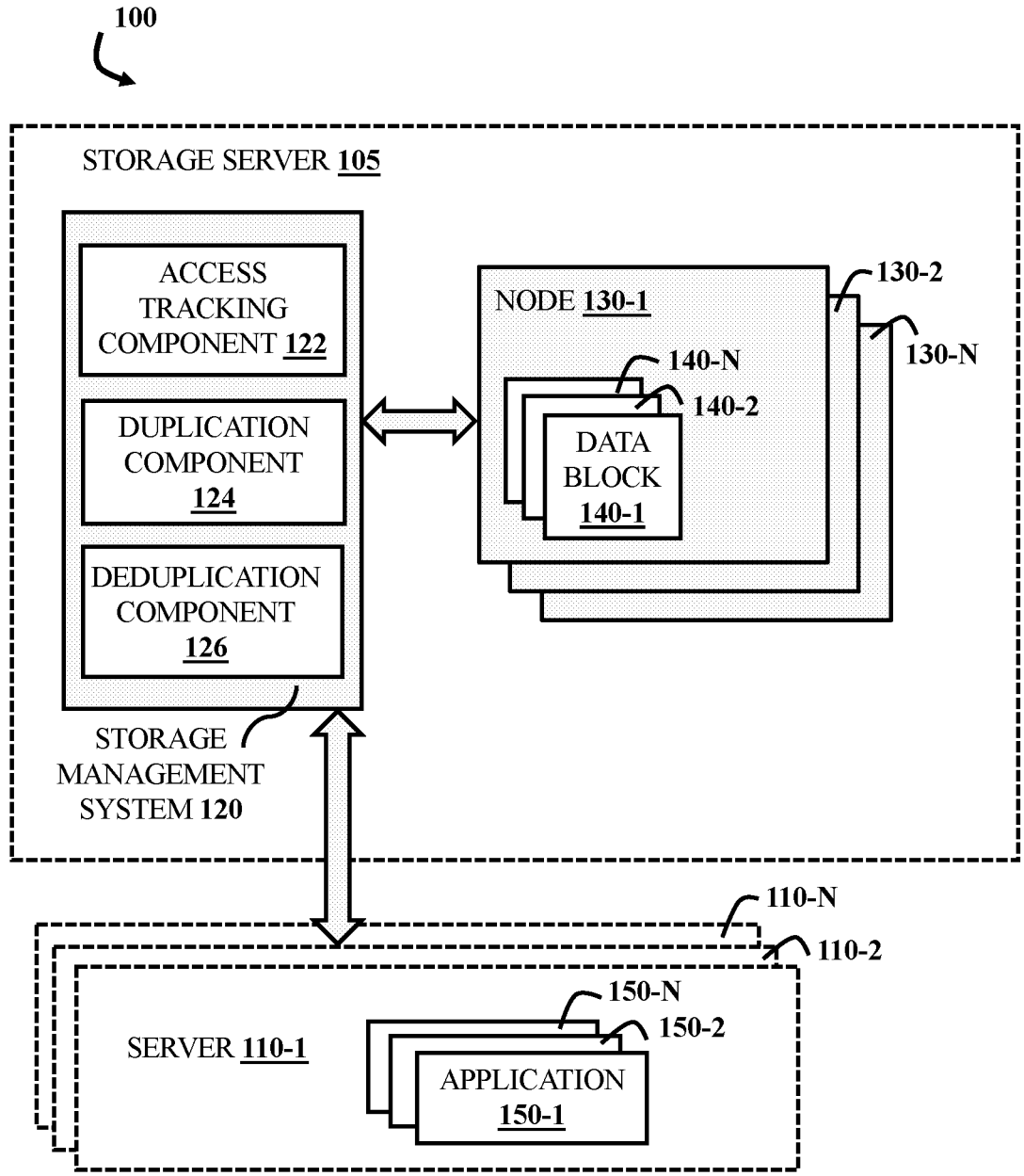
FIG. 1 is a block diagram illustrating a storage system environment, according to some embodiments of the present disclosure.

FIG. 1 is a block diagram illustrating a storage system environment 100, according to some embodiments. The storage system environment 100 includes a storage server 105 connected to one or more additional servers 110-1, 110-2, 110-N, collectively referred to as server 110. According to some embodiments, the storage server 105 and the server 110 can be physical servers, virtual servers, cloud servers, etc., and they can be connected by a network (e.g., a Local Area Network (LAN), a Storage Area Network (SAN), a Wide Area Network (WAN), a Metropolitan Area Network (MAN), the Internet, etc.). Though FIG. 1 illustrates a single storage server 105, there can be multiple storage servers 105 in other embodiments, and these storage servers 105 can be distributed.

In some embodiments, the storage server 105 contains a storage management system 120 and nodes 130-1, 130-2, 130-N, collectively referred to as node 130. Additionally, the server 110 has nodes 135-1, 135-2, 135-N, collectively referred to as node 135. The nodes 130 of the storage server 105 include data blocks 140-1, 140-2, 140-N, collectively referred to as data block 140. A data block 140 can be any type of data (e.g., text, numbers, images, videos, etc.) stored in a computer-readable format. The nodes 135 of the server 110 include applications 150-1, 150-2, 150-N, collectively referred to as application 120, and the server 110 can execute applications 150 that submit access requests for data blocks 140 in the storage server 105. An application 150 can be any computer program that performs a group of coordinated tasks, functions, or activities. Examples of applications include word processors, spreadsheets, web browsers, email, media players, photo editors, etc. Applications can also include enterprise software, such as software for accounting, billing, business intelligence, business process management, data management, resource planning, asset management, etc. It should be noted that nodes are not limited to the components illustrated in FIG. 1. For example, a node could contain both applications 150 and data blocks 140.

When the server 110 and its applications 150 submit access requests for data blocks 140, the access requests are processed by the storage management system 120, which then returns the requested results to the server 110. The server 110 can submit access requests to the storage system 120 using file-based access protocols (e.g., the Common Internet File System (CIFS) protocol, the Network File System (NFS) protocol, the Transmission Control Protocol/Internet Protocol (TCP/IP), etc.). The server 110 can also submit requests using block-based access protocols (e.g., the Fibre Channel Protocol (FCP), Internet Small Computer System Interface (iSCSI), Storage Area Network (SAN) access, etc.).

The storage management system 120 can balance conserving storage space with avoiding input/output bottlenecks that can form when multiple applications 150 attempt to access a data block 140 at the same or substantially the same time. This balance can be achieved by duplicating data blocks 140 that are in high demand, and deduplicating data blocks 140 that are not in high demand. Components of the storage management system 120 involved in managing the storage of data blocks 140 include an access tracking component 122, a duplication component 124, and a deduplication component 126.

In some embodiments, the access tracking component 122 can continuously track access requests for a data block 140 over a period of time. Additionally, the access tracking component 122 can determine the number of access requests in a given time, and whether the number of access requests for a data block 140 is at, above, or below an access request threshold. The number of access requests for the data block 140 in relation to the threshold can determine whether duplication or deduplication will occur. If the number of access requests for a data block 140 is at or above the threshold, the data blocks 140 can be duplicated, and if the number of access requests for a data block falls below the access request threshold, the data blocks 140 can be deduplicated. Examples of access request thresholds can include a given quantity of requests for a data block 140, a given length of read latency when applications 150 attempt to access a data block 140, the presence of an input/output bottleneck formed when applications 150 attempt to access a data block 140, etc. The access tracking component 122 can determine whether there is an input/output bottleneck, the length of the read latency, the quantity of access requests, etc.

The storage system 120 also includes a duplication component 124, which can create copies of data blocks 140. If the access tracking component 122 determines that duplication should occur, such as when an access request threshold has been exceeded, the duplication component 124 creates copies of a data block 140. For example, the duplication component 124 can create copies of a data block 140 if the access tracking component 124 determines that the number of access requests for the data block 140 is greater than a given threshold number of access requests. One example of a threshold number of access requests is 40 access requests, but other numbers can be used. In many cases, the threshold number of access requests may be assigned to a period of time. For example, if the threshold number of access requests for a data block 140 is 40 access requests in 10 seconds, and the access tracking component detects that the data block 140 receives 50 access requests in 10 seconds, the duplication component 124 can create additional copies of the data block 140.

If the access tracking component 122 determines that duplicate copies of a data block 140 are not needed, the number of duplicate copies can remain the same or be reduced by deduplication. Deduplication is a method of data compression that removes redundant copies of a data block 140 in order to save storage space, and it can be carried out by a deduplication component 126. The deduplication component 126 is included in the storage management system 120. An example of when the access tracking component 122 can instruct the deduplication component 126 to deduplicate data blocks 140 is when the access tracking component 122 determines that the number of access requests for a data block 140 falls below the access request threshold. And, in some embodiments, deduplication may occur if the number of copies of a data block 140 is at or above a threshold number of copies. As the access tracking component 122 tracks access requests, it can dynamically duplicate and deduplicate data blocks 140 as the need arises.

Because deduplication removes copies of data blocks 140, it can increase available storage space. However, data deduplication can lead to longer read latencies when multiple applications 150 make access requests for a limited number of copies of a data block 140. For example, the storage server 105 may initially store 100 duplicate copies of a data block 140, and all but one of these copies may be removed by the deduplication component 126. If multiple applications 150 attempt to access the single remaining copy of the data block 140, an input/output bottleneck can occur, causing a longer read latency. As discussed above, an input/output bottleneck can be avoided if the duplication component 124 creates additional copies of the data blocks 140 for which there is a high demand. The presence of these new copies can result in an application 150 being able to access a data block 140 more quickly.

Figure 2:
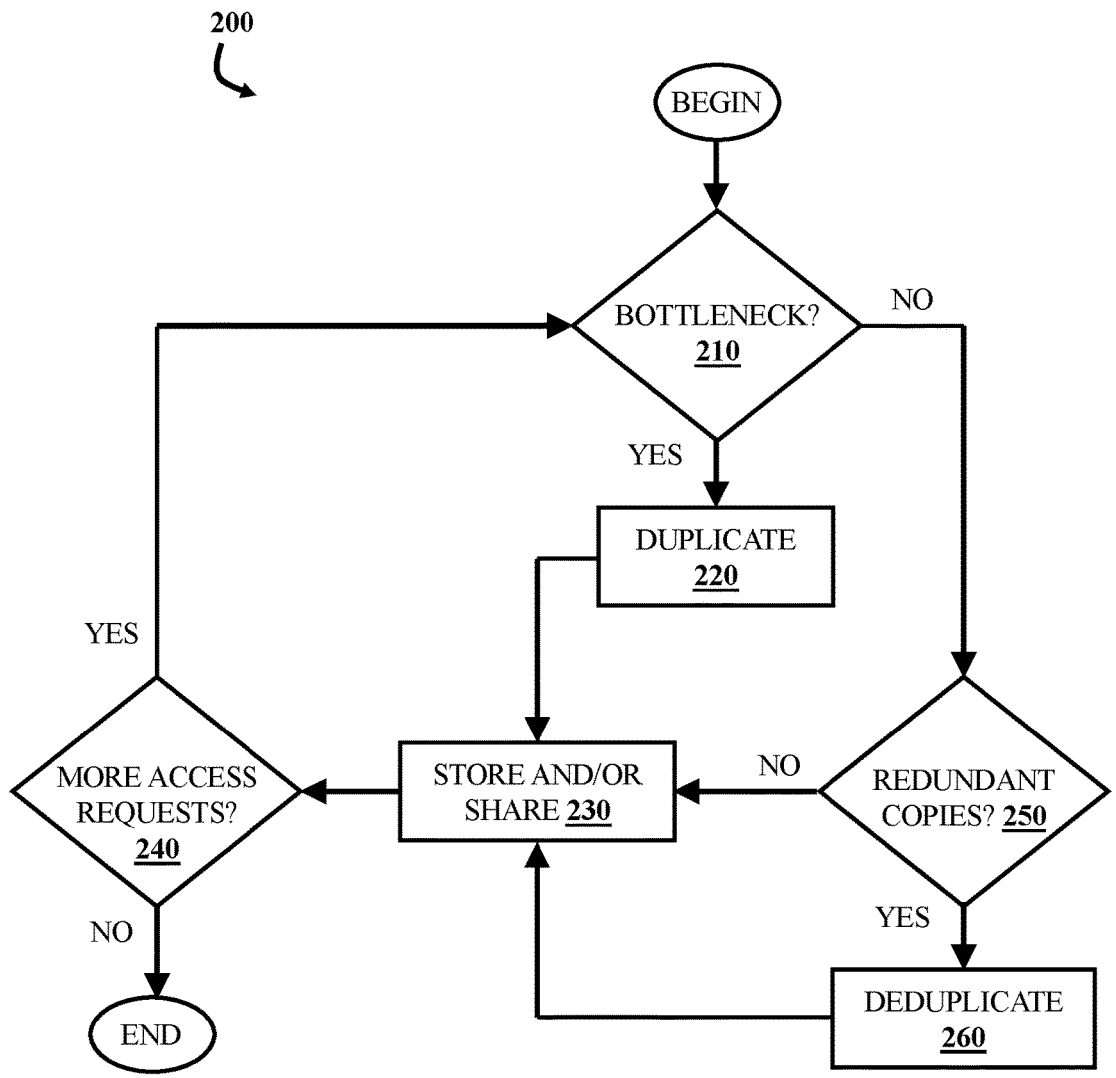
FIG. 2 is a flow diagram illustrating a process of data storage management, according to some embodiments of the present disclosure.

FIG. 2 is a flow diagram illustrating a process 200 of data storage management, according to some embodiments. In process 200, the number of copies of a data block 140 are adjusted based on the demand for copies of the data block 140. If there are insufficient copies of the data block 140 for the number of applications 150 attempting to access the data block 140, an input/output bottleneck can occur. In operation 210, the access tracking component 122 determines if there is an input/output bottleneck. An input/output bottleneck can be considered an access request threshold, which determines whether duplication will occur; other examples of access request thresholds are discussed below.

If the access tracking component 122 detects an input/output bottleneck in operation 210, the access request threshold has been exceeded, and additional copies of the data block 140 are created by the duplication component 124 in operation 220. The presence of additional copies can allow an application 150 to access a data block 140 more quickly than if there were an input/output bottleneck caused by multiple applications 150 attempting to access an insufficient number of copies of the data block 140. In operation 230, duplicate copies created in operation 220 are stored and/or shared with applications 150 requesting access to the data block 140.

In operation 240, the access tracking component 122 determines whether there are additional access requests for a data block 140 that was stored and/or shared in operation 230. If there are additional access requests, process 200 returns to operation 210, and the access tracking component 122 again determines whether an input/output bottleneck exists. Having repeated operation 210, process 200 continues as before. However, if no more access requests are found in operation 240, process 200 ends.

If, in operation 210, the access tracking component 122 detects that there is no input/output bottleneck, the access request threshold has not been exceeded, and the data block 140 is not duplicated. Instead, the access tracking component 122 determines, in operation 250, whether or not there are redundant copies of the data block 140. If there are redundant copies of the data block 140, these copies are removed by the deduplication component 126 in operation 260. Additionally, in some embodiments, there can be a threshold number of copies of the data block 140 that determines the extent to which deduplication will occur. In these cases, if the number of duplicate copies exceeds the threshold, the redundant copies are removed. For example, a threshold number of copies may be set so that, if there are more than 100 copies of a data block 140, the additional copies of the data block 140 are considered redundant. The redundant copies can be removed, and the remaining 100 copies of the data block 140 can be stored and/or shared in operation 230.

However, if the access tracking component 122 determines that there are no redundant copies of the data block 140 in operation 250, the non-redundant data blocks 140 are stored and/or shared in operation 230. Whether or not the access tracking component 122 finds redundant copies of the data block in operation 250, in operation 240 it determines whether there are additional access requests for the data block 140. If there are additional access requests, operation 210 is repeated in order to determine whether an input/output bottleneck exists, and process 200 continues as before. If there are no more access requests, process 200 ends.

Though FIG. 2 illustrates the detection of an input/output bottleneck in operation 210, alternative measures can be employed to determine data blocks 140 should be duplicated or deduplicated. As discussed above, the access tracking component 122 can track the number of access requests for the data blocks 140 and determine whether the number of access requests exceeds a threshold number of access requests. In some cases, if the number of access requests is above the threshold number, duplicate copies of the data block 140 can be created. Another example of an access request threshold can be the length of the read latency when applications 150 attempt to access the data block 140. A threshold length of read latency can be given by the user, and, if the read latency exceeds the given length, the data block 140 can be duplicated. Still another example of an access request threshold can be the presence of an input/output bottleneck when applications 150 attempt to access a data block 140. Further, in some embodiments, duplication or deduplication may occur according to policies established by an organization. In one example, the access tracking module 122 may determine that a backup process is scheduled, triggering duplication. Duplication and deduplication according to policies is discussed in greater detail below.

In some embodiments, if duplicate copies of a data block 140 are available, the storage management system 120 can distribute the available copies to applications 150 in a way that limits overlap when applications 150 attempt to access the same data block 140. In some examples, "n" number of copies per number of access requests may be available, and these copies can be accessed by applications 150 in a round robin scheme. In other examples, data coloring techniques can be employed so that copies of the data block 140 are distributed in a way that reduces the number of applications 150 accessing the same copy. In cases such as these, if multiple applications 150 request access to a particular data block 140, the storage management system 120 can direct the applications 150 to different copies of the data block 140. This can reduce the number of input/output bottlenecks caused when multiple applications 150 simultaneously attempt to access the same data block 140.

Increasing or decreasing the number of copies of a data block 140 can also allow storage space to be balanced with performance during backup processes. Backup processes can be recognized by their sequential data reading access patterns, as compared to the more random access patterns that typically characterize interactive applications. Additionally, some organizations run scheduled backup processes according to established policies. This can mean that one group of machines is backed up at a given time, and another group is backed up at a different time. Taking the scheduling policies into account, the duplication component 124 can create copies of data blocks 140 when they are needed for backup processes at designated times. Additionally, backup processes may be carried out by multiple users who share the same data blocks 140. In these cases, storage management system 120 may point each user's backup process to a different copy of the same data block 140. This can prevent input/output bottlenecks from forming when multiple users are running backup processes.

Figure 3:
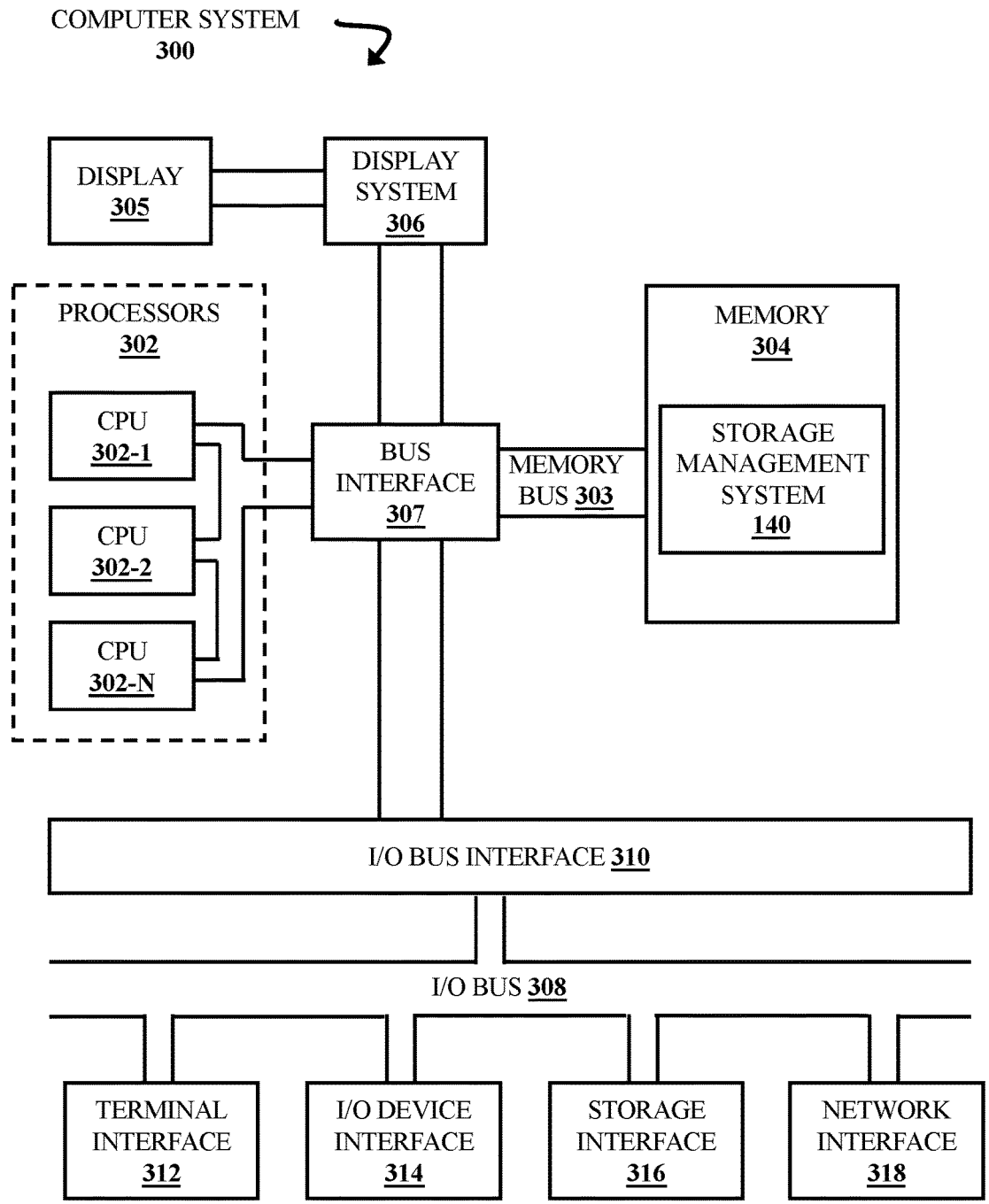
FIG. 3 is a block diagram illustrating a computer system, according to some embodiments of the present disclosure.

FIG. 3 is a high-level block diagram illustrating an exemplary computer system 300 that may be used in implementing one or more of the methods, tools, and components, and any related functions, described herein (e.g., using one or more processor circuits or computer processors of the computer), in accordance with embodiments of the present disclosure. In some embodiments, the major components of the computer system 300 may comprise one or more processors 302, a memory subsystem 304, a terminal interface 312, a storage interface 316, an input/output device interface 314, and a network interface 318, all of which may be communicatively coupled, directly or indirectly, for inter-component communication via a memory bus 303, an input/output bus 308, bus interface unit 307, and an input/output bus interface unit 310.

The computer system 300 may contain one or more general-purpose programmable central processing units (CPUs) 302-1, 302-2, and 302-N, herein collectively referred to as the CPU 302. In some embodiments, the computer system 300 may contain multiple processors typical of a relatively large system; however, in other embodiments the computer system 300 may alternatively be a single CPU system. Each CPU 302 may execute instructions stored in the memory subsystem 310 and may include one or more levels of on-board cache.

The memory 304 may include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. The memory 304 may also contain a storage management system 120, which is discussed with respect to FIG. 1.

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though storage management system 120 is illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, storage management system 120 may include instructions that execute on the processor 302 or instructions that are interpreted by instructions that execute on the processor 302 to carry out the functions as further described in this disclosure. In another embodiment, storage management system 120 is implemented in hardware via semiconductor devices, chips, logical gates, circuits, circuit cards, and/or other physical hardware devices in lieu of, or in addition to, a processor-based system. In another embodiment, storage management system 120 may include data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 may be a multi-user mainframe computer system, a single-user system, or a server computer or similar device that has little or no direct user interface, but receives requests from other computer systems (clients). Further, in some embodiments, the computer system 300 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
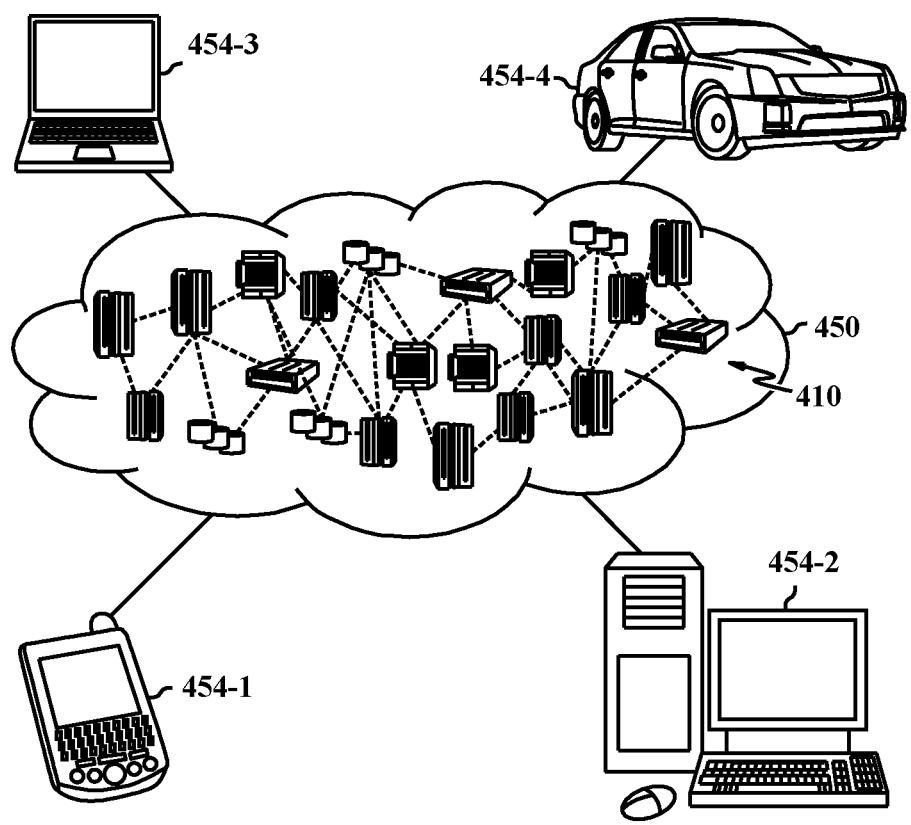
FIG. 4 is a block diagram illustrating a cloud computing environment, according to some embodiments of the disclosure

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454-1, desktop computer 454-2, laptop computer 454-3, and/or automobile computer system 454-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454-1-454-4 shown in FIG. 4 are intended to be illustrative only and that computing nodes 410 and cloud computing environment 450 can communicate with any type of computerized device over any type of network and/or network addressable connection (e.g., using a web browser).

Figure 5:
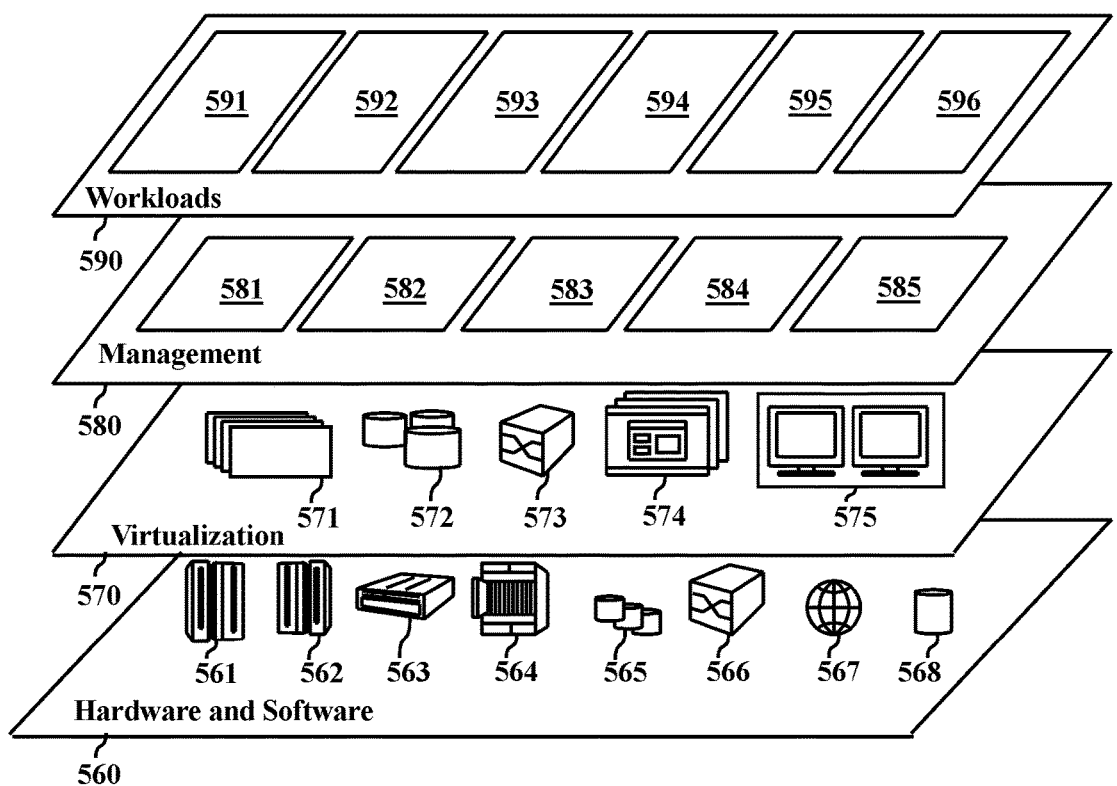
FIG. 5 is a block diagram illustrating abstraction model layers, according to some embodiments of the disclosure.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and storage management 596.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of data storage management, comprising:
   tracking a quantity of access requests for at least one data block;
   tracking a quantity of current copies of the at least one data block;
   determining that the quantity of access requests exceeds an access request threshold;

creating at least one additional copy of the at least one data block in response to the determining that the quantity of access requests exceeds the access request threshold;

detecting an input/output bottleneck formed when more than one application requests access to a data block from the at least one data block; and moving at least one current copy of the at least one data block in response to the detecting the input/output bottleneck.

2. The method of claim 1, wherein the access request threshold is a given quantity of access requests for the at least one data block within a given period of time.

3. The method of claim 1, further comprising measuring a length of a read latency for accessing the at least one data block.

4. The method of claim 3, wherein the access request threshold is a given length of the read latency for accessing the at least one data block.

5. The method of claim 1, further comprising removing the at least one current copy of the at least one data block when the quantity of the current data blocks exceeds a threshold number of data blocks.

6. A system comprising:
at least one processing component;
at least one memory component;
an access tracking component configured to:
    track a quantity of access requests for at least one data block and a current quantity of copies of the at least one data block;
    determine that the quantity of access requests for the at least one data block exceeds an access request threshold; and
    detect an input/output bottleneck formed when more than one application requests access to a single data block from the at least one data block;
a duplication component configured to create at least one additional copy of the at least one data block in response to the determining that the quantity of the access requests for the at least one data block exceeds an access request threshold; and
a deduplication component configured to move at least one current copy of the data block in response to the detecting the input/output bottleneck.

7. The system of claim 6, wherein the access request threshold is a given quantity of access requests for the at least one data block within a given period of time.

8. The system of claim 6, wherein the access tracking component is further configured to measure a length of a read latency for accessing the at least one data block.

9. The system of claim 8, wherein the access request threshold is a given length of the read latency for accessing the at least one data block.

10. A computer program product for data storage management, the computer program product comprising a computer readable storage medium having program instructions embodied therewith, the program instructions executable by a processor to cause the device to perform a method comprising:
receiving access requests for at the least one data block;
tracking a quantity of the access requests for at the least one data block;
tracking a quantity of current copies of the at least one data block;
determining that the quantity of the access requests for the at least one data block exceeds a threshold number of access requests;
creating at least one additional copy of the at least one data block in response to the determining that the quantity of the access requests for the at least one data block exceeds the access request threshold;
detecting an input/output bottleneck formed when more than one application requests access to a data block from the at least one data block; and
moving at least one current copy of the at least one data block in response to the detecting the input/output bottleneck.

11. The computer program product of claim 10, wherein the access request threshold is a given quantity of access requests for the at least one data block within a given period of time.

12. The computer program product of claim 10, further comprising:
determining that the quantity of the access requests has fallen below the access request threshold; and
moving the at least one current copy of the at least one data block in response to the determining that the quantity of the access requests has fallen below the access request threshold.

13. The computer program product of claim 10, wherein the creating of the at least one additional copy of the at least one data block and the moving the at least one current copy of the at least one data block are directed by instructions in an established policy.

* * * * *